US007324923B2

(12) United States Patent
DellaVilla, Jr. et al.

(10) Patent No.: US 7,324,923 B2
(45) Date of Patent: Jan. 29, 2008

(54) SYSTEM AND METHOD FOR TRACKING ENGINE CYCLES

(75) Inventors: Salvatore A. DellaVilla, Jr., Charlotte, NC (US); Thomas Christiansen, Waxhaw, NC (US); Robert Steele, Jr., Charlotte, NC (US)

(73) Assignee: Strategic Power Systems, Inc., Charlotte, NC (US)

( * ) Notice: Subject to any disclaimer, the term of this patent is extended or adjusted under 35 U.S.C. 154(b) by 0 days.

(21) Appl. No.: 11/428,641

(22) Filed: Jul. 5, 2006

(65) Prior Publication Data

US 2007/0016818 A1 Jan. 18, 2007

Related U.S. Application Data

(60) Provisional application No. 60/698,712, filed on Jul. 13, 2005.

(51) Int. Cl.
*G06F 11/30* (2006.01)
*G06F 15/00* (2006.01)

(52) U.S. Cl. ...................................... 702/188; 702/183

(58) Field of Classification Search ................ 702/188, 702/182, 183, 81; 700/99, 106; 701/33, 701/35
See application file for complete search history.

(56) References Cited

U.S. PATENT DOCUMENTS

| | | | | |
|---|---|---|---|---|
| 6,691,064 | B2 * | 2/2004 | Vroman | 702/183 |
| 7,209,817 | B2 * | 4/2007 | Abdel-Malek et al. | 701/33 |
| 2003/0084019 | A1 * | 5/2003 | Woodmansee | 707/1 |
| 2004/0049480 | A1 * | 3/2004 | Burrill et al. | 707/1 |

* cited by examiner

*Primary Examiner*—Bryan Bui
(74) *Attorney, Agent, or Firm*—Hoffman, Warnick & D'Alessandro LLC

(57) ABSTRACT

A system and method for detecting/calculating engine cycles, tracking engine cycles and correlating the engine cycles to parts to measure accumulated cycles associated with the parts. A system is disclosed that includes a parts tracking system for tracking serialized parts contained within the machine; an interface for importing cycles data on the machine via a remote data collection unit, wherein the cycles data includes full cycle, partial cycle, and trip cycle data; and a cycles calculation system for calculating accumulated cycles for each of the serialized parts contained within the machine based on the imported cycles data.

24 Claims, 7 Drawing Sheets

48 50 52 54 56 58 60 62 64

| Parent Serial Number | Parent Part Number | Parent Description | Part Number | Serial Number | Part Description | Location | Date of Life Expended Reading | Accumulated Cycles | | |
|---|---|---|---|---|---|---|---|---|---|---|
| | | | | | | | | Life Limit | Life Expended | Life Remaining |
| 614LM60-1B-01 | 354B3750G001 | HPT Rotor | 317A2534P002 | L60H24711 | Stage 1 Disk | GT01 | 1/16/2006 | 10,100 | 9,533 | 567 |
| 614LM60-1B-01 | 354B3750G001 | HPT Rotor | 317B4576P001 | L60R56784 | Stage 2 Disk | GT01 | 1/16/2006 | 6,200 | 2,783 | 3,417 |
| 614LM60-1B-01 | 354B3750G001 | HPT Rotor | 317A6969G004 | L60H24861 | Diffuser Assembly | GT01 | 1/16/2006 | 6,200 | 5,923 | 277 |
| 614LM60-1B-01 | 354B3750G001 | HPT Rotor | 317A3919P001 | L60C34416 | Spacer, Impeller | GT01 | 1/16/2006 | 15,900 | 12,933 | 2,967 |

66 68 70

47

FIG. 5

| Part Number | Serial Number | Part Description | Company | Site | Plant | Unit | Installed Date | Removed Date |
|---|---|---|---|---|---|---|---|---|
| 317A2534P002 | L60H24711 | Stage 1 Disk | Raeburn Power Inc. | Totteridge Drive | Totteridge Energy Center | GT02 | 10/24/1997 | 8/20/1999 |
| 317A2534P002 | L60H24711 | Stage 1 Disk | Raeburn Power Inc. | Totteridge Drive | Totteridge Energy Center | GT01 | 11/6/1999 | |
| 317B4576P001 | L60R56784 | Stage 2 Disk | Raeburn Power Inc. | Totteridge Drive | Totteridge Energy Center | GT02 | 10/24/1997 | 8/20/1999 |
| 317B4576P001 | L60R56784 | Stage 2 Disk | Raeburn Power Inc. | Totteridge Drive | Totteridge Energy Center | GT01 | 11/6/1999 | |
| 317A6969G004 | L60H24861 | Diffuser Assembly | Raeburn Power Inc. | Totteridge Drive | Totteridge Energy Center | GT02 | 10/24/1997 | 8/20/1999 |
| 317A6969G004 | L60H24861 | Diffuser Assembly | Raeburn Power Inc. | Totteridge Drive | Totteridge Energy Center | GT01 | 11/6/1999 | |
| 317A3919P001 | L60C34416 | Spacer, Impeller | Raeburn Power Inc. | Totteridge Drive | Totteridge Energy Center | GT02 | 10/24/1997 | 8/20/1999 |
| 317A3919P001 | L60C34416 | Spacer, Impeller | Raeburn Power Inc. | Totteridge Drive | Totteridge Energy Center | GT01 | 11/6/1999 | |

FIG. 7

SYSTEM AND METHOD FOR TRACKING ENGINE CYCLES

This application claims priority from provisional application Ser. No. 60/698,712, filed on Jul. 13, 2005, entitled "LM RELIABILITY REVIEW," which is hereby incorporated by reference.

BACKGROUND OF THE INVENTION

1. Technical Field

The present invention relates generally to processing data collected from a machine, and more particularly relates to automatically detecting/calculating cycles data for an engine and tracking cycles data for an engine and correlating the cycles data to parts within engine.

2. Related Art

Engines, such as those used on jet airplanes and in land based power generation applications, are subject to a great number of stresses from the constant cycling of the engine. Cycling generally refers to the starting and stopping of the engine, as well as any increases and decreases in power output. The cycling of an engine can result in thermal stresses that impact the expected lifetime of the parts in the engine.

Because engine failure can be extremely costly, if not catastrophic, tracking the cycles of an engine has become a critical task in the operation of such engines. Based on collected engine cycles data and the characteristics of the individual parts, remaining lifetime of each part can be estimated using known or estimated formulas. Most current methodologies of cycles tracking utilize processes where operators manually record cycles data for an engine. Unfortunately, such methodologies have numerous drawbacks, including: (1) they are prone to operator error; (2) they do not allow for the accurate tracking of partial cycles, e.g., a decrease in power, followed by an increase; and (3) they lack an automated process for correlating cycles tracking data to the individual parts of an engine to provide expended and remaining lifetime data of the parts.

Accordingly, a need exists for a system that can automatically track cycles data of an engine and correlate the cycles data to individual parts to provide lifetime data for the parts.

SUMMARY OF THE INVENTION

The present invention addresses the above-mentioned problems, as well as others by providing a cycles tracking system and method that can automatically track cycles data of an engine and correlate the cycles data to individual parts to provide lifetime data for the parts.

In a first aspect, the invention provides a system for tracking cycles for parts of a machine, comprising: a parts tracking system for tracking serialized parts contained within the machine; a remote data collection unit to automatically detect cycle activity occurring on the machine and to calculate cycles data; an interface for importing cycles data from the remote data collection unit, wherein the cycles data includes full cycle, partial cycle, and trip cycle data; and a cycles calculation system for calculating accumulated cycles for each of the serialized parts contained within the machine based on the imported cycles data.

In a second aspect, the invention provides a method for correlating cycles data with parts of a machine, comprising: storing and tracking serialized parts contained within the machine; detecting cycle activity occurring on the machine and calculating cycles data via a remote data collection unit; importing cycles data from the remote data collection unit, wherein the cycles data includes full cycle, partial cycle, and trip cycle data; and calculating accumulated cycles for each of the serialized parts contained within the machine based on the imported cycles data.

In a third aspect, the invention provides a computer program product stored on a computer usable medium for correlating cycles data with parts of a machine, comprising: program code configured for storing and tracking serialized parts contained within the machine; program code configured for importing cycles data occurring on the machine via a remote data collection unit, wherein the cycles data includes full cycle, partial cycle, and trip cycle data; and program code configured for calculating accumulated cycles for each of the serialized parts contained within the machine based on the imported cycles data.

In a fourth aspect, the invention provides a method for deploying a cycles tracking application, comprising: providing a computer infrastructure being operable to: store and track serialized parts contained within a remote engine; import cycles data occurring on the remote engine collected via a remote data collection unit; and calculate accumulated cycles for each of the serialized parts contained within the remote engine based on the imported cycles data.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a report that correlates parts with accumulated cycle data in accordance with an embodiment of the present invention.

FIG. 7 depicts a report showing parts being tracked between different units within a plant.

DETAIL DESCRIPTION OF THE INVENTION

Figure 1:
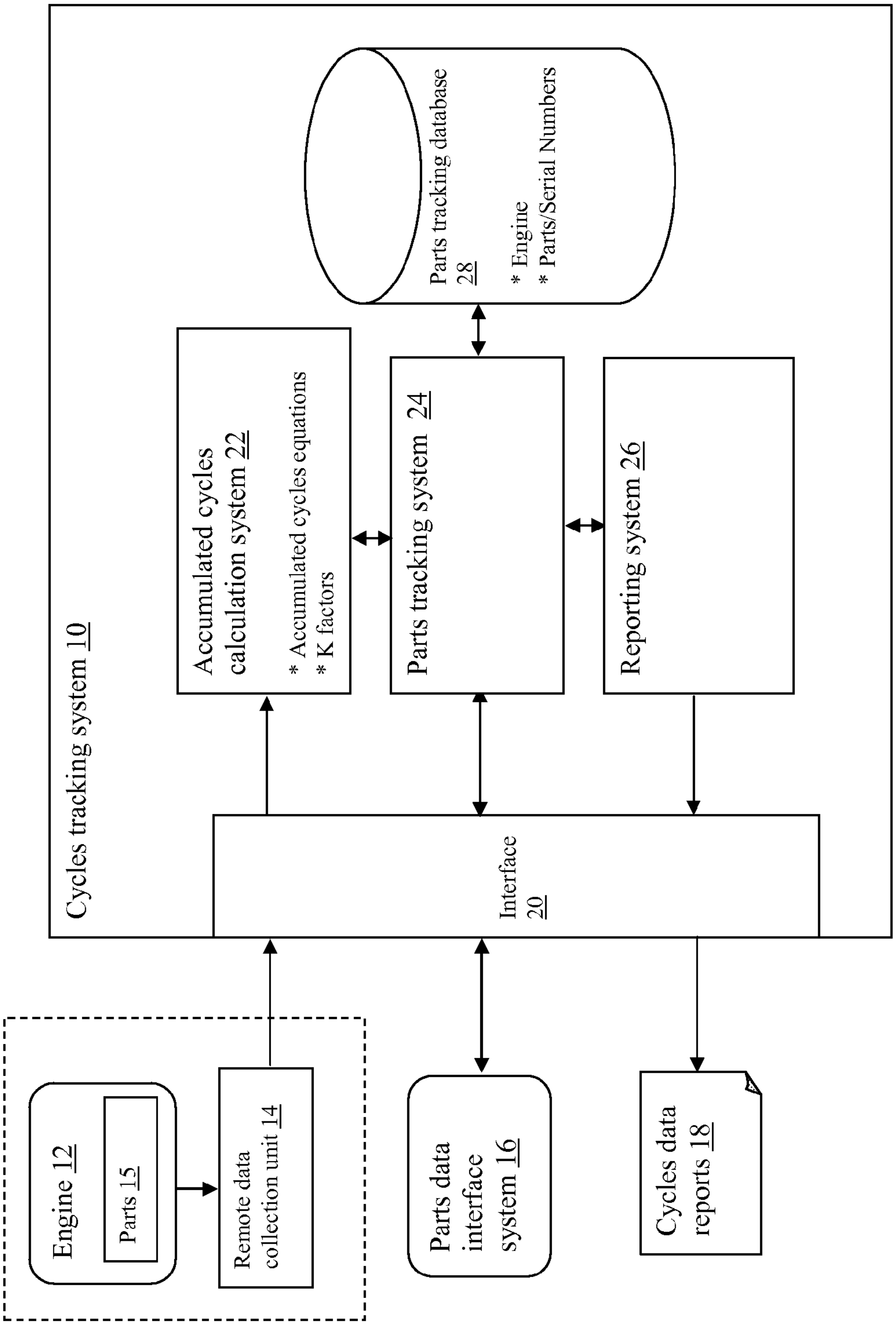
FIG. 1 depicts a cycles tracking system in accordance with an embodiment of the present invention.

Referring now to the figures, FIG. 1 depicts a cycle tracking system 10, which interfaces with remote data collection unit 14 and automatically detects, calculates, collects and tracks cycle data for engine 12. As described in further detail below, cycles tracking system 10 correlates cycle data with parts data, such that the life data for each of the individual parts 15 in engine 12 can be automatically determined in a near real-time, continuous, on-demand manner. Note that while this illustrative embodiment is described with respect to tracking cycles of an engine 12, the invention could be applied to any machine in which cycling affects the lifetime of the parts in the machine. Accordingly, the terms engine, generator, and unit are used interchangeably herein to refer to any such machine.

Cycles tracking system 10 includes an interface 20 that allows for communication of data to and from remote clients and other devices, e.g., over a network such as the Internet. As described below, interface 20 allows for the collection and importation of cycles data from the remote data collection unit 14; provides a web interface to allow a user to enter, modify and view parts data via a parts data interface system; and allows the user to view/obtain cycles data reports 18.

In a typical application, remote data collection unit 14 is installed at the site of the engine 12 to automatically detect and log every full, partial and trip cycle as they occur. Remote data collection unit 14 then transfers the logged cycles data, e.g., via an Internet connection, to the cycles tracking system 10 via interface 20. The transfer can either take place in a continuous manner, e.g., every second, or as a periodic process, e.g., every five minutes. Remote data collection unit 14 determines when a cycle occurs, for instance, by monitoring and analyzing the power output associated with engine 12. An illustrative methodology for identifying partial cycles is described below with reference to FIG. 6.

Cycles tracking system 10 includes an accumulated cycles calculation system 22 that takes the cycles data obtained from the remote data collection unit 14 and calculates accumulated cycles for each part 15 of engine 12. Accumulated cycles calculation system 22 calculates accumulated cycles by: (1) accessing the applicable engine parts list for the engine 12; (2) identifying and applying the appropriate full, partial, and trip cycle K-factors for each part; and (3) applying the appropriate accumulated cycles equations with the cycles data collected from the remote data collection unit 14. Engine parts lists are maintained by a parts tracking system 24, which tracks serialized parts 15 via a parts tracking database 28. A parts data interface system 16 is provided to allow a user to enter parts data for engine 12, including unique serial numbers specific to the actual parts 15 used in engine 12.

For the purposes of this illustrative embodiment, the following definitions are used by cycles tracking system 10 to track cycles and lifetime data of engine parts 15. The "declared life" is the cyclic life limit of a critical life limited part (typically given in cycles). "Accumulated cycles" refer to the calculated life consumed by a part, considering full, partial and trip cycles experienced by the part during operation. When a part reaches the declared life, the part should be replaced. In order to determine how much cyclic life has been expended (i.e., its accumulated life), accumulated cycles calculation system 22 must consider the type of cycle that occurred, the applicable part, and the applicable cycle factor for the specific part.

Full, partial and trip cycles generally refer to three different operational scenarios in which the power output of the engine changes over time. In general, a full cycle refers to a complete start and stop, a partial cycle refers to a slow down followed by a speed up, and a trip cycle refers to a rapid shutdown. The specifics of each type of cycle however may be defined in any manner. In one illustrative embodiment, they are defined as follows. A "full cycle" is a cycle from zero generator speed with acceleration to a high power setting (e.g., any setting above idle) followed by shutdown of the generator. A "partial cycle" is any decrease in power greater than X percent from a current steady state power condition followed by a subsequent increase in power (e.g., >10 percent). A "trip cycle" is a cycle from zero generator speed with acceleration to a high power setting (e.g., any setting above idle) followed by a rapid (i.e., uncontrolled) shutdown of the engine.

A full cycle factor Kf is a coefficient that numerically expresses the amount of damage caused by a full cycle to a given part. A partial cycle factor Kp is the coefficient used to numerically express the amount of damage caused by a partial cycle. In one illustrative application, the partial cycle factor "Kp" is dependent upon the percentage X of power decrease from the steady state power condition. For example, if X=50%, then Kp1=0; If X=50-75%, then Kp2=0.1; and if X=75-100%, then Kp3=0.75. A trip cycle factor Kt is the coefficient used to numerically express the amount of damage caused by a trip cycle for a given part.

Figure 2A:
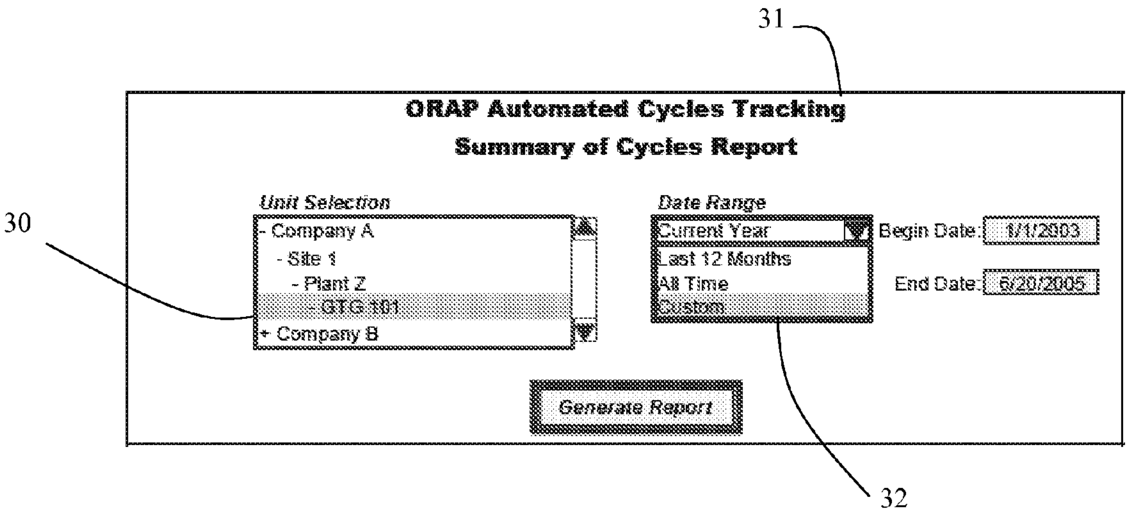
FIGS. 2A and B depict a reporting interface showing total cycles by period in accordance with an embodiment of the present invention.
Figure 2B:
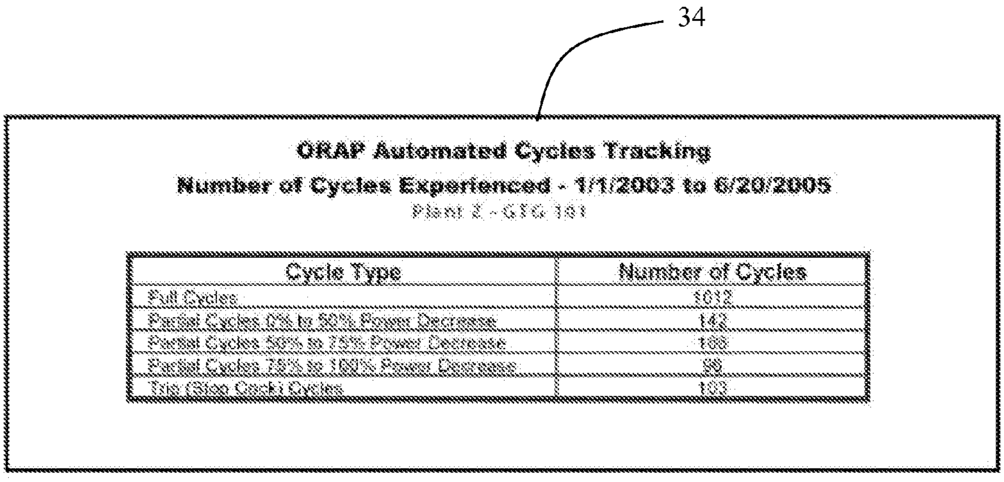

Reporting system 26 is utilized to output cycles data reports 18 back to the user. Cycles data reports 18 may include information at a company level, a location level, a plant level, a machine level, or a part level. For example, FIG. 2A depicts an illustrative user interface 31 that allows a user to select a particular unit 30 (i.e., location, plant, or machine) for a particular date range 32 and generate a report 34, as shown in FIG. 2B. In this case, the report details the number and types of cycles for a particular machine during the selected date range 32.

Figure 3A:
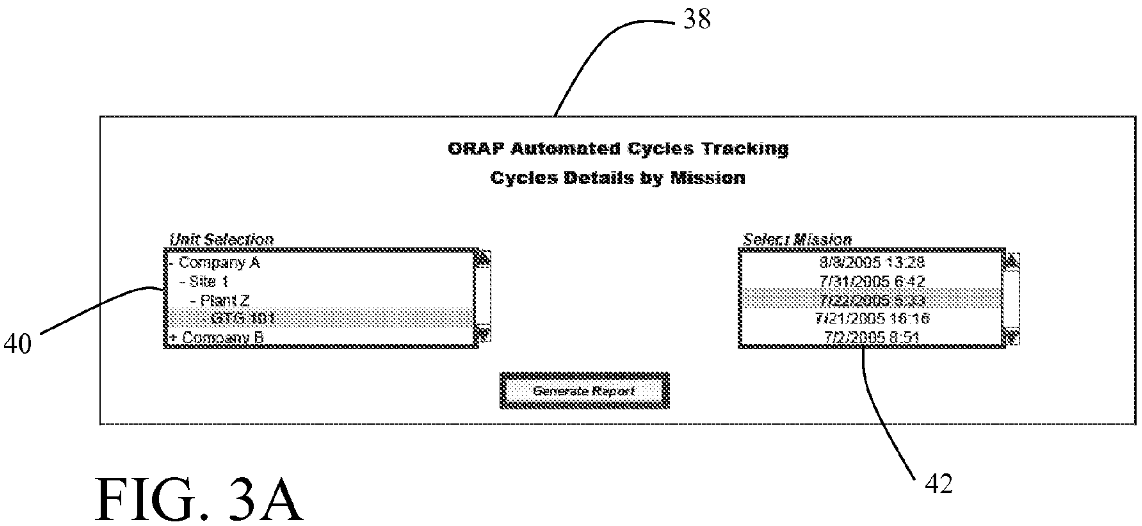
FIGS. 3A and B depict a reporting interface showing total cycles by mission in accordance with an embodiment of the present invention.
Figure 3B:
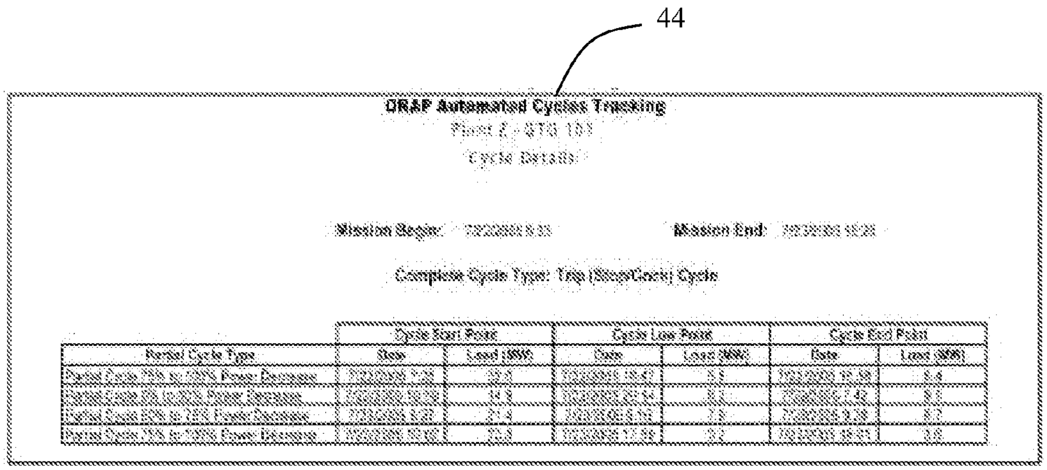

FIGS. 3A and 3B depict a further reporting example in which user interface 38 allows the user to select a unit 40, as well as a mission 42. A resulting report 44 is then generated that shows a breakdown of the partial cycles that occurred during the mission, including cycle start points, low points and end points.

Figure 4:
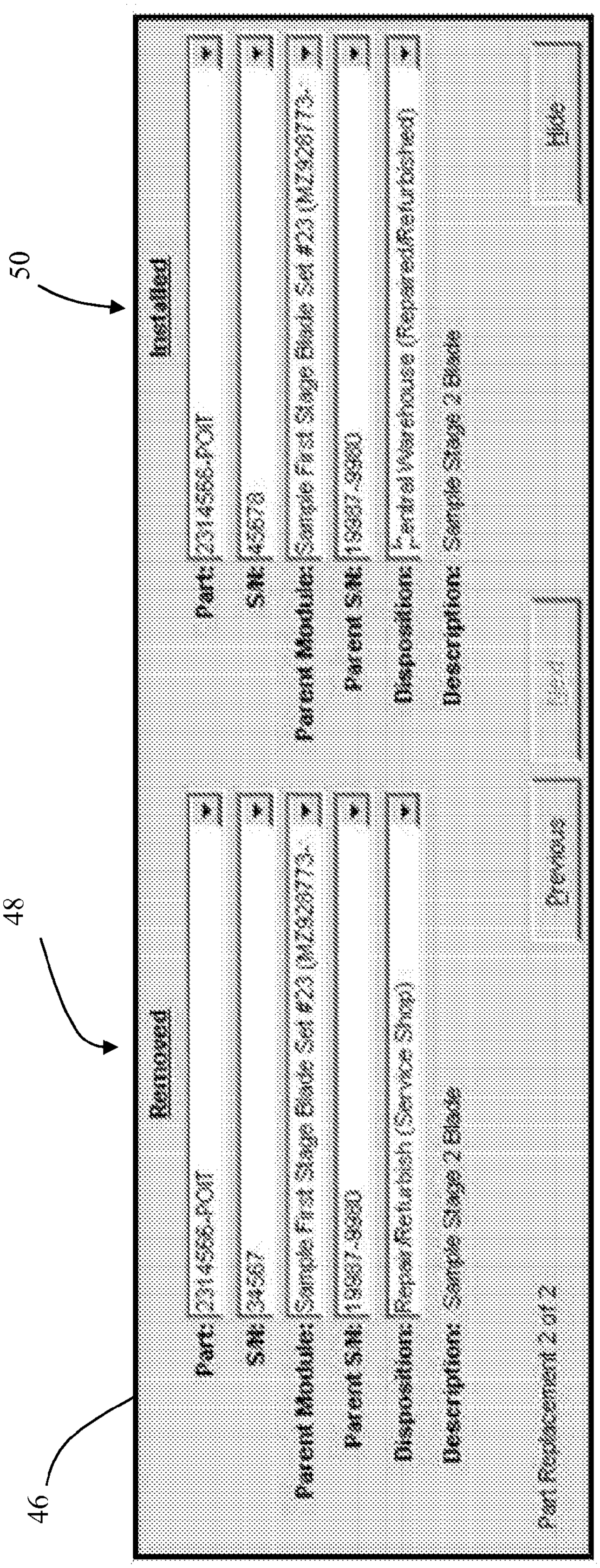
FIG. 4 depicts an interface for entering parts information in accordance with an embodiment of the present invention.

In addition, reporting system 26 can provide cycle data reports at the part level. As noted, parts data is managed by the parts tracking system 24. FIG. 4 depicts an illustrative parts data interface system 46 for entering parts data into the parts tracking database 28. In this example, the user is able to enter a removed part 48, and an installed part 50 for a given engine 12. Information provided by the user includes a part number, a serial number for the part, a parent module, a parent serial number, and a disposition. Thus, parts tracking system 24 can be constantly kept updated regarding the specific parts contained within engine 12, even when parts are changed between different engines, between engines at different lactations, etc. Obviously, the interface 46 shown in FIG. 4 is but one of many different types of interfaces that could be utilized to enter, modify and view data within the parts tracking system 24. An alternative system for tracking parts could include radio frequency ID tags (or the like) affixed to the engine parts that could be scanned by a reader to provide location and status information of parts to the parts tracking system 24.

FIG. 5 depicts an example of a cycle data report 47 in which cycle information is provided at the part level. In this example, the generated cycle data includes: (1) parent information about each part, i.e., a parent serial number 48, a parent part number 50, and a parent description 52, which informs the user what machine or part structure the part resides within; (2) part information, i.e., a part number 54, a serial number 56, and a part description 58; (3) a plant location 60; (4) a date of expended life reading 62; and (5) accumulated cycles data 64. The date of expended life reading 62 discloses the date when the cycles data was loaded off of the remote data collection unit 14 and imported into the cycles tracking system 10. The accumulated cycles data 64 includes: (1) a declared life limit value 66; (2) a life expended value 68; and (3) and a life remaining value 70 for each part (e.g., in cycles) as determined by the accumulated cycles calculation system 22. Accordingly, for any given part in engine 12, cycles data report 47 tells the user the total expected cyclic lifetime associated with the part, the amount of cyclic lifetime used up to date, and the amount of cyclic lifetime left for the part.

In a typical application, the manufacturer of the part and/or engine will provide a declared life limit value 66 for the part, which can for instance be stored along with the K factors for the part in the parts tracking database 28. Using the cycles data collected from the remote data collection unit 14, accumulated cycles calculation system 22 will calculate the life expended values 68. Life remaining values 70 are obtained by subtracting the life expended values 68 from the declared life limit values 66.

As noted above, life expended values 68 are determined based on a set of accumulated cycles equations. Similar to the declared life limit values 66, accumulated cycles equations would typically be provided by the manufacturer of the parts. An illustrative accumulated cycles equation is as follows:

Accumulated Cycles=(*Kf*×Full Cycles)+(*Kp*1×Partial Cycles from 0% to 50% load)+(*Kp*2×Partial Cycles from 50% to 75% Load)+(*Kp*3×Partial Cycles Greater than 75% load)+(*Kt*×Trips).

Figure 6:
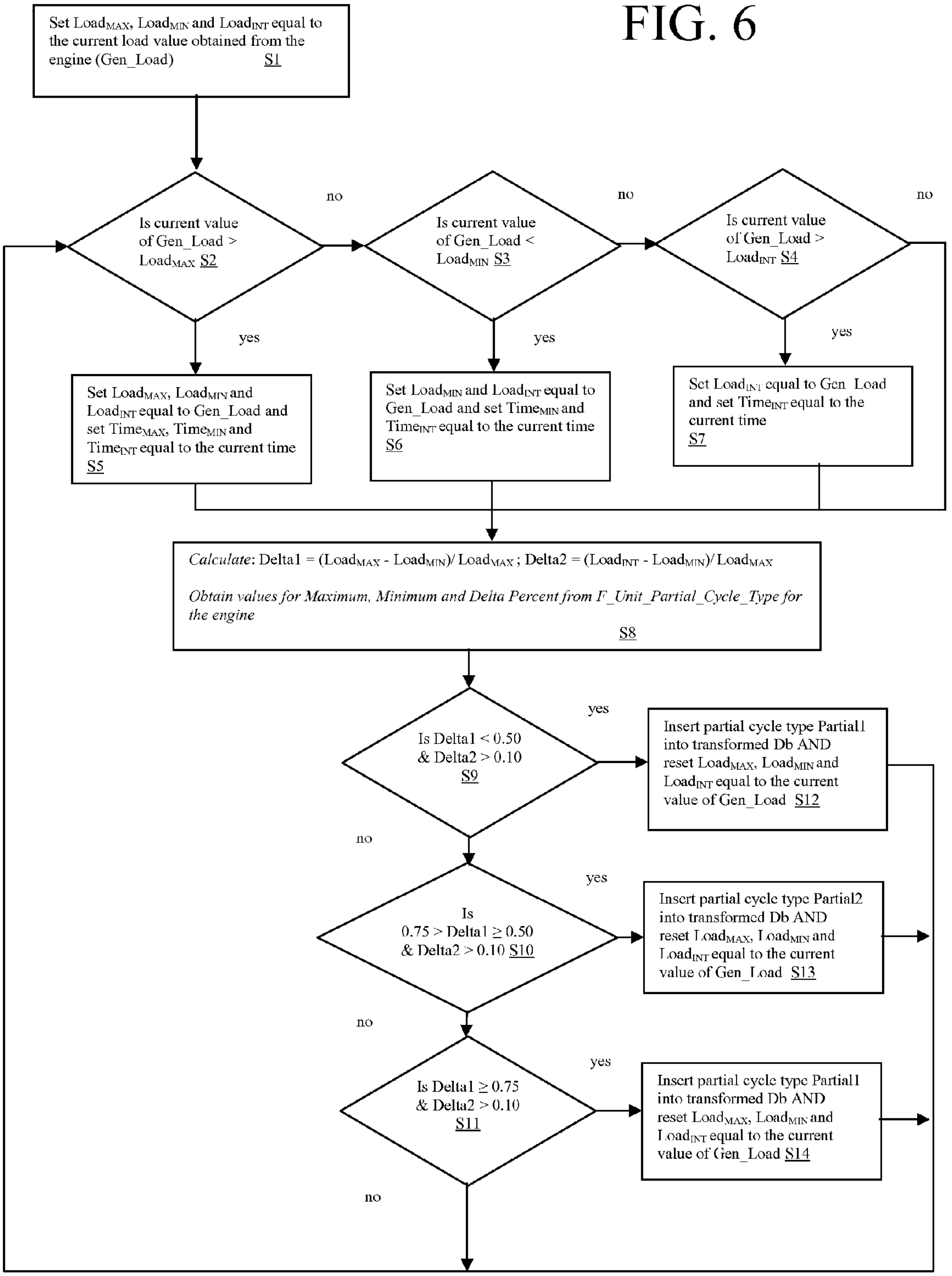
FIG. 6 depicts a flow chart showing a method for detecting/calculating partial cycles data in accordance with an embodiment of the present invention.

FIG. 6 depicts a flow chart showing an illustrative methodology used by remote data collection unit to identify and log partial cycles as they occur on engine 12. At step S1, $Load_{MAX}$, $Load_{MIN}$ and $Load_{INT}$ are set equal to the current load value obtained from the engine (Gen_Load), and the methodology then loops as follows. At step S2, a check is made to see if the current value of Gen_Load is greater than $Load_{MAX}$. If yes, then at step S5 $Load_{MAX}$, $Load_{MIN}$ and $Load_{INT}$ are set equal to Gen_Load and $Time_{MAX}$, $Time_{MIN}$ and $Time_{INT}$ are set equal to the current time (i.e., the time that Gen_Load was obtained), and then control is passed to step S8. If no, then a check is made at step S3 to see if the current value of Gen_Load is less than Load_MIN. If yes, then at step S6 $Load_{MIN}$ and $Load_{INT}$ are set equal to Gen_Load and $Time_{MIN}$ and $Time_{INT}$ are set equal to the current time, and then control is passed to step S8. If no, then a check is made at step S4 to see if the current value of Gen_Load is greater than $Load_{INT}$. If yes, then at step S7 $Load_{INT}$ is set equal to Gen_Load and $Time_{INT}$ are set equal to the current time, and then control is passed to step S8. If no, then control is passed to step S8.

At step S8, Delta1 and Delta2 are calculated as:

$$Delta1=(Load_{MAX}-Load_{MIN})/Load_{MAX};\text{ and}$$

$$Delta2=(Load_{INT}-Load_{MIN})/Load_{MAX}.$$

At step S9, a check is made to see if Delta1 <0.50 and Delta2>0.10. If yes, then at step S12 a partial cycle of type "Partial Cycle from 0% to 50% Load" is stored in a database and $Load_{MAX}$, $Load_{MIN}$ and $Load_{INT}$ are reset equal to Gen_Load. If no, then at step S10, a check is made to see if Delta1 ≧0.50 and <0.75, and Delta2 >0.10. If yes, then at step S13 a partial cycle of type "Partial Cycles from 50% to 75% Load" is stored in the database and $Load_{MAX}$, $Load_{MIN}$ and $Load_{INT}$ are reset equal to Gen_Load. If no, then at step S11, a check is made to see if Delta1 >0.75 and Delta2 >0.10. If yes, then at step S12, a partial cycle of type "Partial Cycles Greater Than 75% Load" is stored in the database and $Load_{MAX}$, $Load_{MIN}$ and $Load_{INT}$ are reset equal to Gen_Load. Control then loops back up to step S2, where the process is continuously repeated.

FIG. 7 depicts an additional report that shows parts being tracked between different units within a plant. The ability of parts tracking system 24 to track serialized parts as they are inserted and removed from different engines allows expended and remaining life calculation to be accurately determined, even as parts are interchanged among engines.

In general, cycles tracking system 10 (as well as the logic in remote data collection unit 14) may be implemented on any type of computer system. In a typical application, cycles tracking system 10 would be implemented as part of a client/server architecture. A typical computer system for running, cycles tracking system 10 generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including remote data collection unit 14, a monitor/display, speakers, storage, another computer system, a hand-held device, keyboard, mouse, voice recognition system, speech output system, printer, facsimile, pager, etc. The bus provides a communication link between each of the components in the computer system and likewise may comprise any known type of transmission link, including electrical, optical, wireless, etc. Additional components, such as cache memory, communication systems, system software, etc., may be incorporated into the computer system.

Access to cycles tracking system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment, e.g., using web services.

It should be appreciated that the teachings of the present invention could be offered as a business method on a subscription or fee basis. For example, a cycles tracking system 10 comprising systems for tracking parts and calculating accumulated cycles based on imported cycle data from a remote data collection unit 14 could be created, maintained and/or deployed by a service provider that offers the functions described herein for customers. That is, a service provider could offer to provide cycle tracking as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for correlating cycles for parts of a machine, comprising:

a remote data collection unit located at a site where the machine resides, wherein the remote data collection unit automatically detects cycle activity occurring on the machine and distinguishes full cycle, partial cycle, and trip cycle data cycles data; and a cycles tracking system located remotely from the remote data collection unit that includes:

a parts tracking system for tracking serialized parts contained within the machine;

an interface for importing cycles data from the remote data collection unit; and a cycles calculation system for calculating accumulated cycles for each of the serialized parts contained within the machine based on the imported cycles data.

2. The system of claim 1, wherein the parts tracking system allows for the tracking of parts at a location level, a plant level, a machine level, and a parts level.

3. The system of claim 1, wherein the remote data collection unit further identifies different types of partial cycles.

4. The system of claim 1, wherein the remote data collection unit analyzes a power output of the machine to identify the occurrence of a full cycle, a partial cycle, or a trip cycle in a near real time fashion.

5. The system of claim 1, wherein the cycles calculation system utilizes a set of accumulated cycles equations and K factors to calculate accumulated cycles for the serialized parts.

6. The system of claim 1, wherein the cycles calculation system generates an expended life value for each serialized part and a life remaining life value for each serialized part.

7. The system of claim 1, further comprising a parts data interface for entering, modifying and viewing parts data.

8. The system of claim 1, further comprising a reporting system for generating cycles data reports.

9. A method for correlating cycles data with parts of a machine, comprising:

storing and tracking serialized parts contained within the machine;

detecting cycle activity occurring on the machine and calculating cycles data via a remote data collection unit, wherein the cycles data includes full cycle, partial cycle, and trip cycle data, and wherein the partial cycle data is calculated by examining successive values of a load obtained from the machine over time to determine if a detected change in load drops below one of a plurality of first threshold values and then rises above a second threshold value;

importing cycles data from the remote data collection unit; and calculating accumulated cycles for each of the serialized parts contained within the machine based on the imported cycles data.

10. The method of claim 9, wherein the storing and tracking step tracks parts at a location level, a plant level, a machine level, and a parts level.

11. The method of claim 9, further comprising distinguishing each partial cycle based on the plurality of first threshold values.

12. The method of claim 9, wherein the remote data collection unit analyzes a power output of the machine to identify the occurrence of a full cycle, a partial cycle, or a trip cycle.

13. The method of claim 9, wherein the calculating step utilizes a set of accumulated cycles equations and K factors to calculate accumulated cycles for the serialized parts.

14. The method of claim 9, wherein the calculating step generates an expended life value for each serialized part and a life remaining life value for each serialized part.

15. The method of claim 9, further comprising the step of providing a parts data interface for entering, modifying and viewing parts data.

16. The method of claim 9, further comprising the step of generating cycles data reports.

17. A computer program product stored on a computer usable medium for correlating cycles data with parts of a machine, comprising:

program code configured for storing and tracking serialized parts contained within the machine;

program code configured for importing cycles data occurring on the machine from a remote data collection unit that distinguishes full cycle, partial cycle, and trip cycle data; and program code configured for calculating accumulated cycles for each of the serialized parts contained within the machine based on the imported cycles data.

18. The computer program product of claim 17, wherein the program code configured for storing and tracking serialized parts tracks parts at a location level, a plant level, a machine level, and a parts level.

19. The computer program product of claim 17, wherein the machine comprises an engine.

20. The computer program product of claim 17, wherein the program code configured for calculating accumulated cycles utilizes a set of accumulated cycles equations and K factors to calculate accumulated cycles for the serialized parts.

21. The computer program product of claim 17, wherein the program code configured for calculating accumulated cycles generates an expended life value for each serialized part and a life remaining life value for each serialized part.

22. The computer program product of claim 17, further comprising program code configured for providing a parts data interface for entering, modifying and viewing parts data.

23. The computer program product of claim 17, further comprising program code configured for generating cycles data reports.

24. A method for deploying a cycles tracking application, comprising:

providing a computer infrastructure being operable to:

store and track serialized parts contained within a remote engine;

import cycles data occurring on the remote engine collected via a remote data collection unit that distinguishes full cycle, partial cycle, and trip cycle data; and calculate accumulated cycles for each of the serialized parts contained within the remote engine based on the imported cycles data.

* * * * *